United States Patent [19]

Fukuda

[11] Patent Number: 5,680,646
[45] Date of Patent: Oct. 21, 1997

[54] INPUT/OUTPUT CONTROL SYSTEM

[75] Inventor: Masami Fukuda, Kawasaki, Japan

[73] Assignee: Fujitsu Limited, Kawasaki, Japan

[21] Appl. No.: 360,853

[22] Filed: Nov. 14, 1994

Related U.S. Application Data

[63] Continuation of Ser. No. 853,821, Mar. 19, 1992, abandoned.

[30] Foreign Application Priority Data

Mar. 20, 1991 [JP] Japan .................................. 3-057451

[51] Int. Cl.$^6$ .................................................. G06F 13/00
[52] U.S. Cl. ............................................. 395/872; 395/309
[58] Field of Search ................................. 395/872, 704, 395/309

[56] References Cited

U.S. PATENT DOCUMENTS

| | | | |
|---|---|---|---|
| 4,188,664 | 2/1980 | DeShon | 364/200 |
| 4,710,762 | 12/1987 | Yamada | 345/185 |
| 5,001,744 | 3/1991 | Nishino et al. | 379/93 |
| 5,222,062 | 6/1993 | Shorma et al. | 370/56 |
| 5,226,040 | 7/1993 | Noble, III et al. | 370/56 |

OTHER PUBLICATIONS

Using Microprocessors and Microcomputers: The 6800 Family, Joseph D. Greenfield William C. Wray, 1981 pp. 239–258.

*Primary Examiner*—Glenn A. Auve
*Attorney, Agent, or Firm*—Staas & Halsey

[57] ABSTRACT

The present invention relates to a character input/output processing system in an information processing system. A character input/output system of the present invention includes two buffers, a first buffer for storing input/output character data by the application program and a second buffer for storing input/output character data by the preferential process, which requires preferential character input/output. The character input/output system further includes an input/output adapter which is provided, independent of the processor, between the terminals and processor for the input/output processing between the processor and terminals. The input/output adapter is structured to store the character data inputted from the terminals to the first buffer and the second buffer, and to output the character data stored in the first buffer to the terminals during the operation by the application program or outputs the character data stored in the second buffer to the terminals during the operation by the preferential process. The present invention ensures, even in case the terminals are used in common by the application program and the preferential process, that character input/output by the preferential process can be realized immediately without stopping the operation of the input/output adapter.

5 Claims, 6 Drawing Sheets

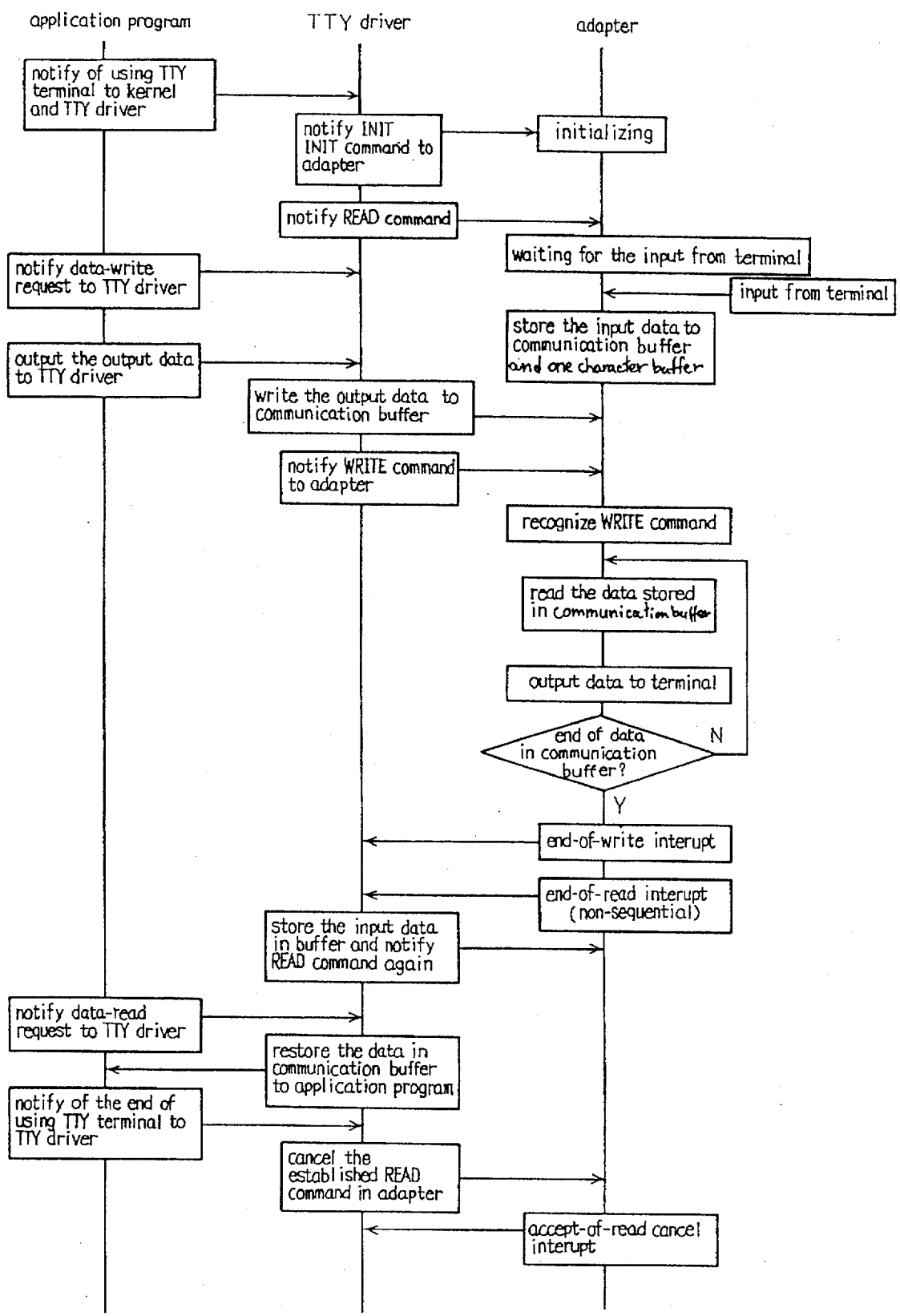

INPUT/OUTPUT CONTROL SYSTEM

This application is a continuation of application Ser. No. 07/853,821, filed Mar. 19, 1992, now abandoned.

BACKGROUND OF THE INVENTION

The present invention relates to a character input/output system in an information processing system and more specifically to a character input/output system in an apparatus for controlling input/output from a terminal using an adapter.

In recent computer systems, processing of operating systems is complicated and a load of CPU tends to increase the load of a CPU for execution of these processings. Moreover, character input/output is executed through an input/output apparatus such as a TTY (teletypewriter) terminal.

If the input/output processing of characters from these input/output apparatuses is carried out with the CPU, the CPU cannot execute the other processings during this period. For instance, when characters are inputted or outputted to or from the TTY terminal, while information is written into a file unit, the writing operation is stopped once for executing the input/output processings from the TTY terminal. Therefore, while the character input/output operations from the TTY terminal are performed, the writing operation to a file unit cannot be executed, making the processings inefficient.

Therefore, a system has been developed so that an input/output processing from an input/output apparatus, such as the TTY terminal, is realized by hardware specific for the input/output process hereinafter referred to as adapter independent of the CPU of the main unit. With such a structure, while the characters from the TTY terminal are inputted or outputted with the adapter, the CPU is capable of realizing parallel processing. Moreover, since the CPU itself is not required to execute the input/output processings, the load of the CPU can be reduced and processing efficiency can also be improved.

In such an information processing apparatus, two kinds of processings are employed: one is the process for operating the application program (hereinafter referred to as the ordinary process); and the other is the process for requiring preferential input/output processing (hereinafter referred to as the preferential process). The preferential process refers to a process for operating a program in preference to the application or ordinary program. Here, the preferential process indicates a program for outputting a message for generation of error on a display screen when an error is generated in the system, or indicates a program called a kernel debugger for debugging a kernel. Since it is desirable to display an error message simultaneously with generation of an error, it is the preferential process which is given a higher priority than the ordinary process and thereby an error message can be displayed with high priority.

For the input/output processings by the preferential process, the method explained hereunder has been used.

As a first method, a terminal only for character input/output processing by the preferential process is connected to an adapter only for input/output processing by the preferential process. In addition to the TTY terminal for character input/output by the ordinary process, the input/output processings are realized through this terminal. FIG. 1 shows a system structure by this method.

In the system of FIG. 1, the adapters 221, 222 are connected to the main unit (CPU) 110. An adapter 221 is usually connected with an input/output TTY terminal 123 by the ordinary process 111, while an adapter 222 is usually connected with an input/output debugger terminal 161 by the preferential process 114, such as the kernel debugger.

The input/output processings of characters by the ordinary process is carried out by the adapter 221 through a TTY driver 115. Instruction for operation from the TTY driver 115 to the adapter 221 and a condition message to the TTY driver 115 from the adapter 221 are made by writing the command to an adapter control register 118 and DCW (Device Command Word) 119. Adapter 221 and TTY driver 115 make reference to the written command and execute the processing depending on the designated command.

The character input/output processings by the preferential process 114 are carried out by the adapter 222 through a preferential process input/output support routine 160. In the preferential process input/output support routine 160, the character data to be outputted to the debugger terminal 161 from the preferential process 114 is informed to the adapter 222 and the character data inputted from the debugger terminal 161 is sent to the preferential process 114 from the adapter 222. With such procedures, the character input/output processing is carried out by the preferential process.

On the other hand, the Japanese Patent-Laid-Open No. 2-184935 discloses the art to realize the input/output process between the ordinary process and preferential process using the same terminal. According to this method, in the case of operating a debugger for a kernel (corresponding to the preferential process) during operation of a target program (corresponding to an ordinary process), operation of the input/output processor is suspended once by issuing interruption to the firmware for controlling the input/output processor from the preferential process, and thereby the processing in the side of target program is suspended. Thereafter, the firmware for the preferential process is down-loaded again to the input/output processor and the input/output processing in the side of preferential process is executed preferentially through a terminal unit.

However, such related art has the following problem. According to the first method, two terminal units of input/output processing, terminal 123 for ordinary process and input/output processing terminal 161 for the preferential process, and two adapters 221, 222, connected respectively to terminals 123, 161, are required. Therefore, the amount of hardware is necessarily increased, requiring the number of man-hours for development of hardware to increase. Moreover, it is also difficult to acquire the area for installing a couple of terminals. For each debug of kernel, the preferential process terminal is connected and thereby the number of terminals to be prepared can be reduced. However, the connection becomes troublesome, degrading the operation. In this case, it is true that two units of terminals are used.

According to the second method, only one unit of a terminal is required, and therefore the problem generated in the first method can be solved. However, the following become problems.

If a start command requested by the ordinary process is being accepted, and if a start command is requested from the preferential process, the start command of the preferential process is not immediately accepted and the preferencial program is started only after the start of ordinary process is accepted.

If the preferencial process is a program of an error message, a message must be outputted simultaneously with generation of the error. However, when the ordinary process is being started, message output by the preferential process cannot be realized until the ordinary processing being started is completed. Therefore, it is impossible to quickly issue an error message to users of the system.

Moreover, when an error message is transmitted, operation in the side of the CPU is generally stopped, and therefore, it is probable that an error message cannot be displayed in some cases due to the delay of timing of transmission.

As a method of solving this problem, it may be thought that an interruption is issued to the ordinary process being started. Thereby, the ordinary process is forced to stop, and thereafter the input/output processing is carried out by the preferential process (corresponding to the second method explained above).

However, the preferential process is inhibited, from its property, to allow interruption from the other process. If an interruption for instructing the end of processing is issued to the ordinary process, it is notified that the interruption is accepted to the preferential process from the ordinary process. However, since the preferential process is inhibited to allow the interruption, the end of the ordinary process cannot be confirmed.

Moreover, since the firmware of input/output processor is stopped once for retrial of down-load, the processing, which has been executed before the start of the preferential process, is stopped. Therefore, if an output to a printer is requested and transmitted to the input/output processor and it is attempted to execute the input/output process by the preferential process, the printer output processing, which is already requested, must be suspended during the course of operation. It is desirable that the output processing, which is already requested be completed without suspension. However, in the second method explained above, it is necessary to request again the output processing after the operation of the preferential process is started for the input/output processor.

The problems of the second method may be solved by the first method and the problems of the first method may also be solved by the second method.

As explained above, problems, which cannot be solved by any method, are generated even if any method is employed.

SUMMARY OF THE INVENTION

It is therefore an object of the present invention to provide an apparatus which realizes the input/output processing of the ordinary process and preferential process with a common terminal and quickly executes the input/output processing in the side of the preferential process without issuing an interruption to the adapter.

The object of the present invention may be achieved by a character input/output system comprising:

a CPU for controlling overall operations of the system as a whole;

terminal unit for inputting or outputting characters to the CPU;

a first buffer for storing input/output character data by the ordinary process;

a second buffer for storing input/output character data by the preferential process which preferentially requires input/output of characters, and input/output processing unit which is provided independent of the CPU and is provided between the terminal unit and CPU to execute the input/output processings between the CPU and the terminal unit, store the character data inputted from the terminal unit to the first buffer and the second buffer, outputs the character data stored in the first buffer to the terminal unit during operation of the ordinary process and outputs the character data stored in the second buffer to the terminal unit during operation of the preferential process.

BRIEF DESCRIPTION OF THE DRAWINGS

FIG. 4 is a diagram illustrating processing procedures of character input/output control by the ordinary process in the present invention.

DESCRIPTION OF THE PREFERRED EMBODIMENTS

Figure 1:
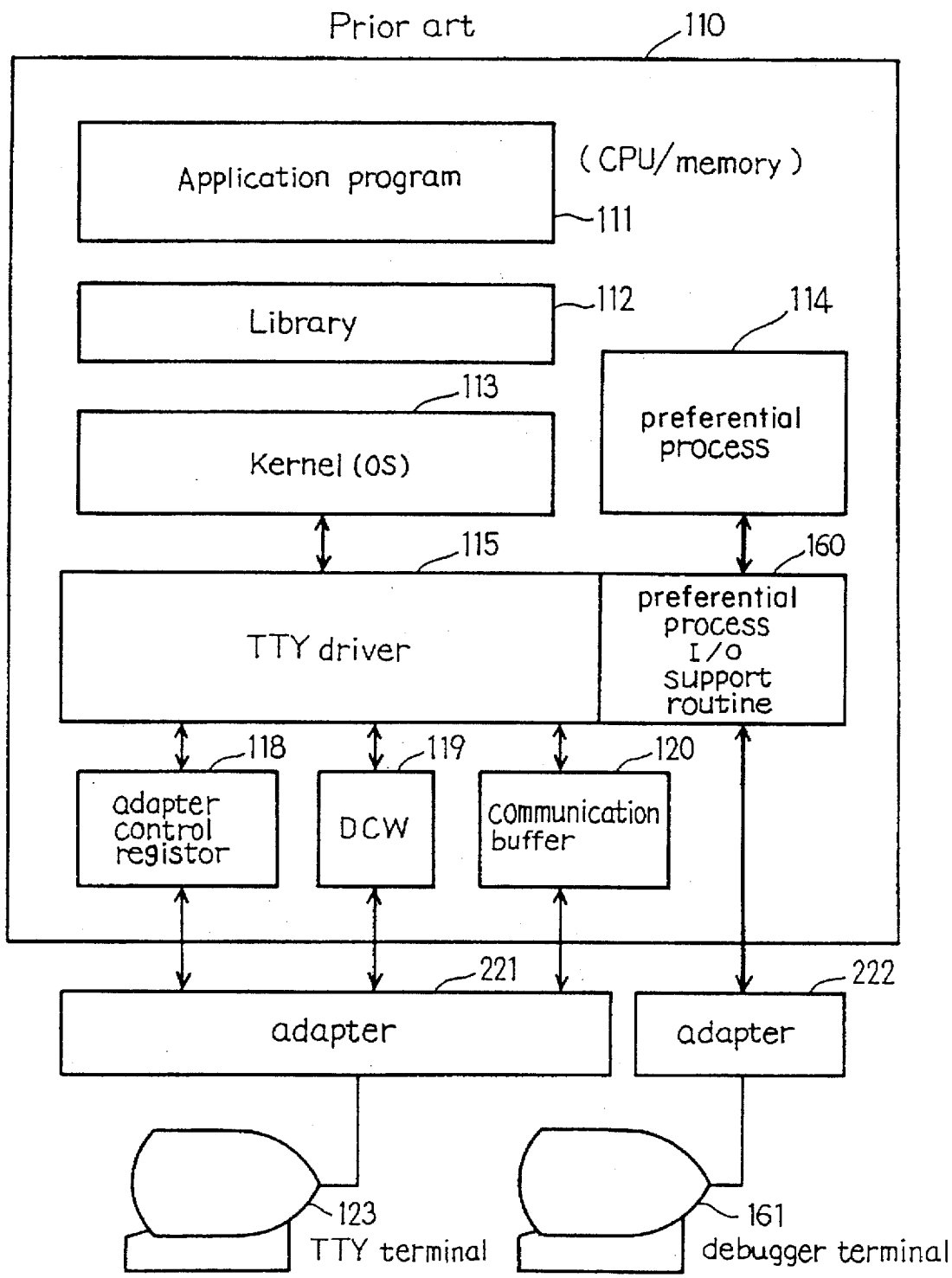
FIG. 1 is a diagram illustrating a structure of an information processing system, which performs input/output control by the related art.
Figure 2:
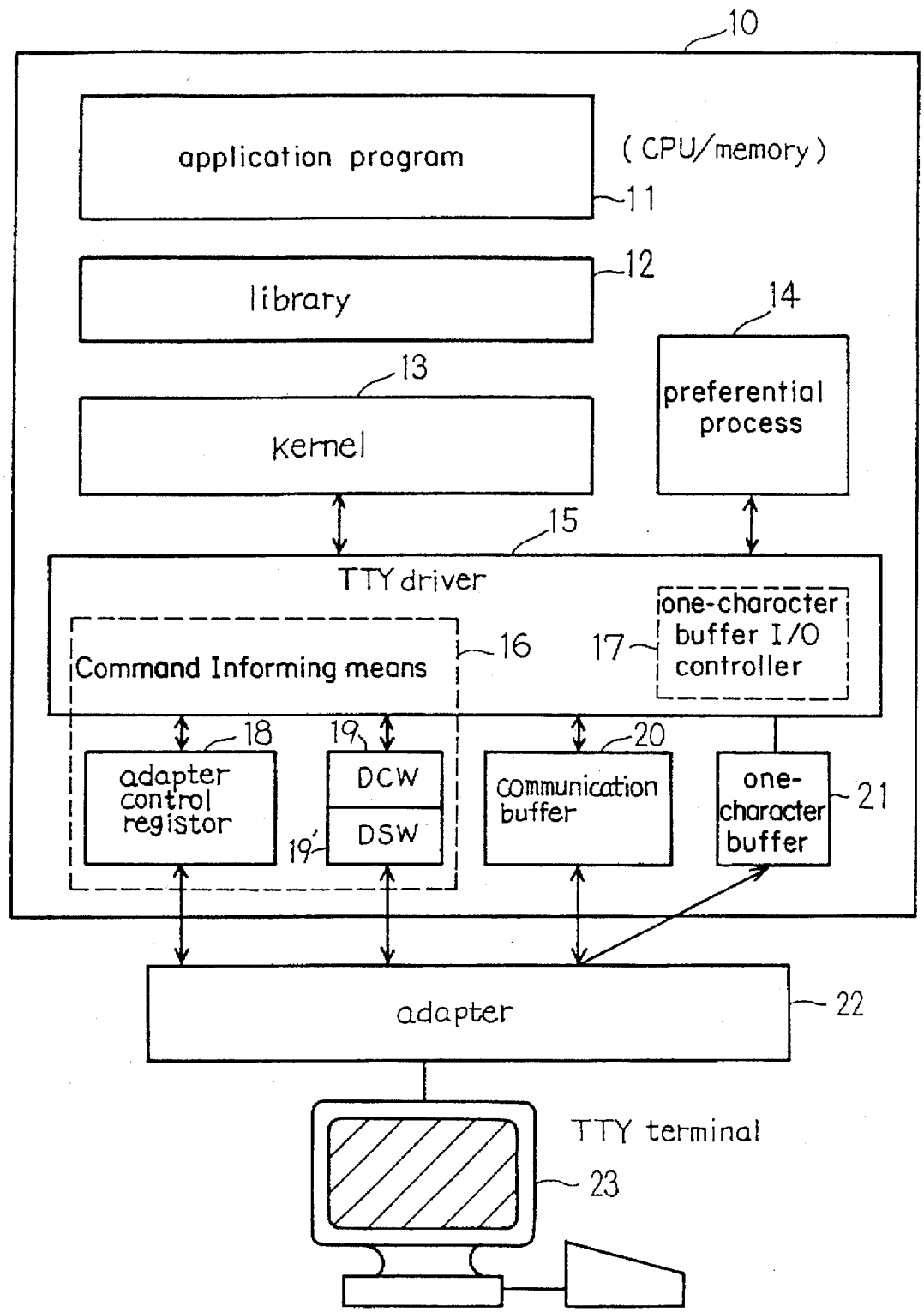
FIG. 2 is a diagram illustrating a structure of an information processing system by an embodiment of the present invention.

FIG. 2 is a diagram illustrating a preferred embodiment of the present invention.

A processing apparatus (hereinafter referred to as CPU) 10 controls the processings in the main unit. TTY terminal 23 inputs or outputs characters to or from CPU 10 and is formed by a keyboard and a display. An adapter 22 is provided independent of the CPU 10 between CPU 10 and TTY terminal 23. This adapter 22 also stores firmware for character input/output between TTY terminal 23 and CPU 10. In this embodiment, the adapter 22 exclusively executes the character input/output processing between the TTY terminal 23 and CPU 10 and it may also be formed in the structure so that the control of the other input/output unit connected to the CPU 10 can be conducted in parallel.

In CPU 10, the ordinary process 11 is a region allowing operation of the application program. A library 12 includes a service routine for character input/output processing by the application program 11. This application program 11 instructs the service routine corresponding to the processing to be executed to the library 12. The kernel 13 is the nucleus of the operating system. The preferential process 14 is the area allowing operation of a program having a high priority, such as a message output program during generation of an error and kernel debugger for debugging the kernel. These programs operate under the condition inhibiting the interruption.

The TTY driver 15 controls operation of TTY terminal 23 and a command informing means 16 thereof generates a command to be informed to the adapter 22. An adapter control register 18 stores a command for instructing operation issued to the adapter 22 from the command informing means 16 or a command informing condition of the adapter 22 issued to the TTY driver from the adapter 22.

A DCW (Device Command Word) 19 is a data and command formed in the format for analyzing the adapter 22 by the command informing means 16 in order to input/output characters for the TTY terminal 23 from or to CPU 10. Moreover, a DSW (Device Status Word) 19' is a command indicating status information of the adapter 22 and is used to inform the CPU 10 of the status of adapter 22. DCW 19 and DSW 19' are set in the communication area on the memory of CPU 10, which may be accessible from both the TTY driver 15 and adapter 22. The firmware set to the TTY driver 15 and adapter 22 executes the processing through transmission and reception of command and data by accessing the adapter control register 18 and DCW 19, DSW 19'.

A one character buffer input/output control means 17 controls for character input/output processing by the preferential process 14 and generates commands to be written into the one character input/output adapter control register 321, which will be explained later.

A communication buffer 20 is used for storing the characters, which are subjected to the input/output processing by the application program 11. Moreover, the one character buffer 21 is used for storing the characters, which are inputted from the TTY terminal 23 at the time of character input by the preferential process 14. Input/output of characters by the one character buffer 21 are conducted in unit of a character. The characters inputted to the one character buffer 21 are sequentially over-written on the characters which are already stored therein, and the latest input characters remain in the one character buffer 21.

Figure 3A:
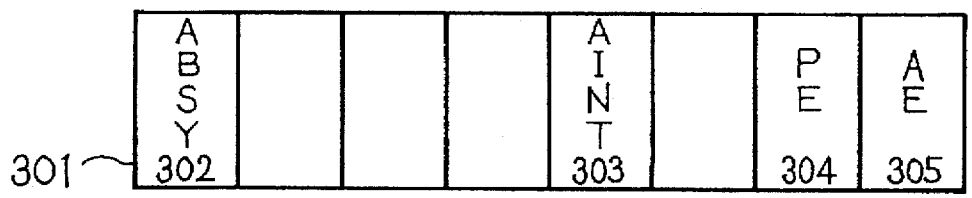
FIGS. 3A–3C are diagrams illustrating a structure of a command, which is sent to an adapter control register of the present invention.
Figure 3B:
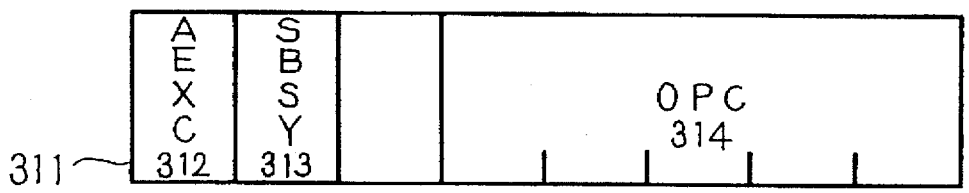
Figure 3C:
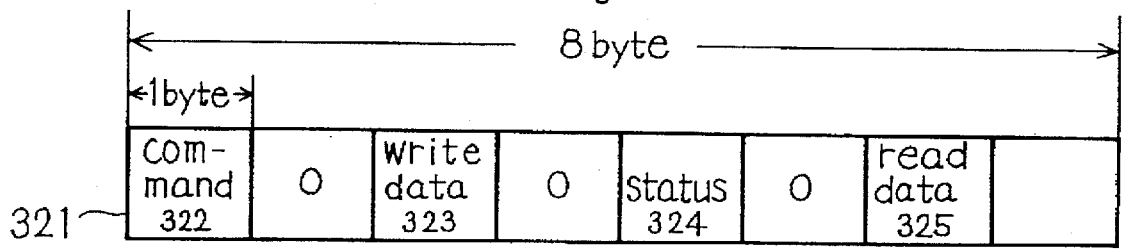

FIGS. 3A–3C indicate the command which is set by the command informing means 16 in the TTY driver 15 to the adapter control register 18 in order to control the adapter 22, and the command indicating the status of adapter 22.

FIG. 3A indicates a STATUS register 301. The STATUS register 301 informs the TTY driver 15 of the status of adapter 22. When the request to the adapter 22 is accepted by the adapter 22 from CPU 10, "1" is set to the area ABSY 302. In this case, the adapter 22 cannot accept the other operation request. When the end interrupt is issued to the TTY driver 15 from the adapter 22, "1" is set to the area AINT 303. To the areas PE304 and AE305, "1" is set respectively when an error is generated in the adapter 22. The TTY driver 15 recognizes the status of adapter 22 written in the adapter control register 18 by making reference to the STATUS register 301.

FIG. 3B is a command register 311 which is used for instructing the operation to the adapter 22 from the TTY driver 15. In this figure, the bits which are turned ON when CPU 10 requests execution of commands to the adapter 22 is set to the area AEXC 312. To the area SBSY313, the bits which are turned ON at the time of operation of the preferential process 14 are set. To the area OPC 314, the commands for designating operation of the adapter 22 are set. As an example of the command, a command for instructing start of the command to the adapter 22 is cancelled.

The addresses in the communication buffer 20 in which the commands and data instructed for the start from the command register 311 are designated in the area DCW19. The commands to be set include the WRITE command for instructing output of characters and the READ command for instructing character input. If the TTY driver 15 instructs operation to the adapter 22, the commands corresponding to the operation for writing the instruction of command start and instructing it to the area DCW 19 are written to the area OPC 314 of the command register 311. The adapter 22 executes, after referencing to the command register 311, the contents written in the area DCW19 as instructed by the command.

FIG. 3C indicates contents of the one character input/output adapter control register 321. As explained previously, commands are written into the one character input/output adapter control register 321 by the one character buffer input/output control means 17. The command area 322 is used by the preferential process 14 for designating character input/output to the adapter 22. The write data area 323 is used for setting the data as many as the one character outputted to the TTY terminal 23 from the preferential process 14. The status area 324 is used for displaying the command completing condition for the preferential process 14. The read data area 323 is used for setting the input data which is inputted from the TTY terminal 23 and stored in the one character buffer 21.

The procedures of character input/output process by the application program 11 will be explained with reference to FIG. 4.

In the case of executing character input to the application program 11 from the TTY terminal 23, the application program 11 transfers the control to the TTY driver 15. Use of TTY terminal 23 from the application program 11 is informed by making a system call to the kernel 13 from the application program 11 through the library 12.

Upon reception of a message of using TTY terminal from the application program 11, the command informing means 16 of the TTY driver 15 writes the INIT command for the adapter 22 into the DCW19 and also writes the INIT command start instruction to the area OPC 314 of the command register 311 for the purpose of initialization of adapter 22. Thereafter, the command informing means 16 sets the READ command to DCW19 so that the adapter 22 can accept input from the TTY terminal 23 and also sets the instruction for starting the READ command to the OPC area 314 in order to issue the READ command to the adapter 22.

The adapter 22 recognizes that the READ command is started by making reference to the adapter control register 18 and DCW19, starts the firmware for character input/output by the application program 11 and enters the condition for waiting for character input from the TTY terminal 23.

If there is a key-input from the TTY terminal 23, the adapter 22 respectively stores input data to the communication buffer 20 and one character buffer 21.

If character output to the TTY terminal 23 from the application program 11 is carried out, data write request is issued to the TTY driver 15 from the application program 11.

Upon reception of the data write request, the TTY driver 15 writes the output data to be outputted by the application program 11 into the communication buffer 20. Consequently, the WRITE command is set to DCW19 from the command informing means 10 and command start is written into the adapter control register 18, thereby issuing the WRITE command for the adapter 22 from the TTY driver 15.

The adapter 22 makes reference to the command register 311 being set to the DCW19 and adapter control register 18 to recognize that the WRITE command is issued to the adapter 22 from the TTY driver 15. Thereafter, the adapter 22 reads output data stored in the communication buffer 20 and outputs these data to the TTY terminal 23.

When the character data stored in the communication buffer 20 are all outputted to the TTY terminal 23, the adapter 22 turns ON the AINT area 303 of the STATUS register 301 and issues write end interrupt to the TTY driver 18. Thereby, the output process for the TTY terminal 23 from the application program 11 is completed. In this timing, the detail status of output end such as how many bytes are outputted can be stored in the DSW19'. The TTY driver 15 makes reference to the STATUS register 301 and DSW19' to detect the operating condition of the adapter 22.

On the other hand, in case the data as many as designated size are inputted from the TTY terminal 23, or in case the predetermined monitor time has passed after issuance of the READ command from the TTY driver 15, the read end interrupt is issued to the TTY driver 15 from the adapter 22. This read end interrupt is issued asynchronously.

In parallel with read end interrupt, the data inputted by the TTY terminal 23 is stored in the communication buffer 20 by the adapter 22. When read end interrupt is executed, the READ command is issued again to the adapter 22 from the command informing means 16.

After issuing the data write request to the TTY driver 15, the application program 11 waits for write end message from the adapter 22. This write end message is issued to the TTY driver 15 from the adapter 22, when the TTY driver 15 has issued the WRITE command to the adapter 22.

In case, the application program 11 fetches the input data from the TTY terminal 23 stored in the communication buffer 20, the data read request is issued to the TTY driver 15 from the application program 11 through the library 12.

The TTY driver 15 receives the data read request of the application program 11 and returns the data stored in the communication buffer 20 to the application program 11. The application program 11 executes the process using the data returned from the TTY driver 15.

After repeating these processes, when the necessary characters are inputted or outputted, the application program 11 issues the application end message for the TTY terminal 23 to the TTY driver 15.

Upon reception of the application end message for the TTY terminal 23, the READ command issued previously to the adapter 22 from the command informing means 16 is cancelled. The adapter 22 issues a read cancel acceptance interrupt for the READ command cancel to the TTY driver 15 and completes the service for the application program 11.

Figure 5:
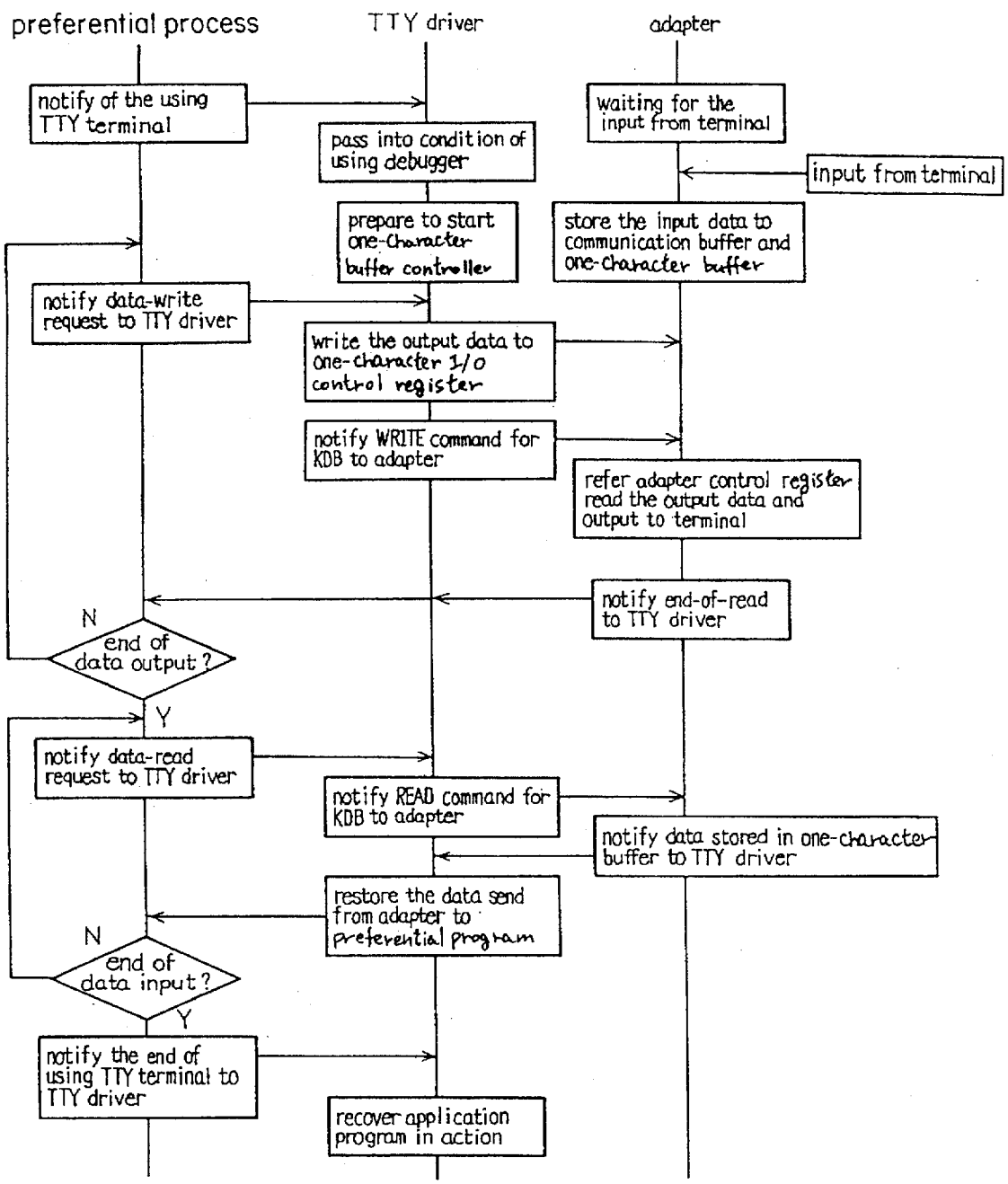
FIG. 5 is a diagram illustrating processing procedures of character input/output control by the preferential process in the present invention.

FIG. 5 is a diagram indicating character input/output processings in such a case that the kernel debugger is started as the preferential process. Hereinafter, the kernel debugger is only referred to as the preferential process 14.

When the preferential process 14 is started, the preferential process 14 issues the application message for TTY terminal 23 to the TTY driver 15.

The TTY driver 15 transitions to the kernel debugger application condition with the TTY terminal application message instructed by the preferential process 11. Simultaneously, the TTY driver 15 temporarily suspends the processing in the side of application program and does not fetch the characters stored in the communication buffer 20.

Consequently, the TTY driver 15 prepares for start of the one character buffer input/output control means 17. Under this condition, the adapter 22 is waiting for input from the TTY terminal 23 and when data is inputted to the adapter 22 from the TTY terminal 23, the adapter 22 stores the input data to the communication buffer 20 and the one character buffer 21.

In case the preferential process 14 is required to output characters to the TTY terminal 23, the preferential process 14 issues the data write request to the TTY driver 15. With the output request from the preferential process 14, the command informing means 16 of the TTY driver 15 issues the WRITE command of the interrupt mask for kernel debugger to the adapter 22. In this case, the bits in the SBSY area 313 of the command register 311 are turned ON. The adapter 22 makes reference to the SBSY area 313 and changes, when such area is ON, the processing under the execution to the character output processing by the preferential process.

Consequently, the command for instructing data output is written, by the one character buffer input/output control means 17, to the command area 322 of the one character input/output adapter control register 321 and the data to be outputted by the preferential process 14 are set, in unit of a character, to the write data area 323 of the one character input/output adapter control register 321.

The adapter 22 makes reference to the adapter control register 18, extracts the output data set to the write data region 323 from the one character input/output adapter control register 321 and then outputs the data to the TTY terminal 23, in accordance with the instruction issued to the command area 322 of the one character input/output adapter control register 321. The adapter 22 sends a message to the TTY driver 15 for each end of output of a character to the TTY terminal 23.

The TTY driver 15 always monitors the end of output by the adapter 22 and returns to the preferential process 14 for each end of output of a character to the TTY terminal 23 from the adapter 22. In case the preferential process 14 continues character output request, the processings explained above are iterated.

In case it is required to input characters while starting the kernel debugger, the data read request is issued to the TTY driver 15 from the preferential process 14. Thereby, the command informing means 16 issues the READ command of interrupt mask for kernel debugger to the adapter 22.

Even during execution of command by the application program 11, the adapter 22 executes the input process requested by the preferential process 14. In this case, the TTY driver 15 stops the character input/output processings by the application program 11 not to read the data stored in the communication buffer 20.

The one character buffer input/output control means 17 sends, when characters are set in the one character buffer 21, contents of such characters to the preferential process 14. When any characters are not set in the one character buffer 21, the one character buffer input/output control means 17 returns "0" to the preferential process 14.

The TTY driver 15 always monitors the end of input from the adapter 22 and it returns, when the data input from the adapter 22 is completed, the data sent from the adapter 22 to the preferential process 14.

The preferential process 14 sends, upon completion of the input processing, a message informing the end of application for the TTY terminal 23 to the TTY driver 15. The TTY driver 15 receives a message informing the end of application for the TTY terminal by the preferential process 14, recovers contents of the communication buffer 20 and restarts operation of the application program 11.

Moreover, when operation of the preferential process is completed, the command informing means 16 turns OFF SBSY313 of the command register 311. When the adapter 22 makes reference to SBSY313 of the command register 311 and confirms that it is OFF and thereby judges that the input/output processing by the preferential process has been completed. Here, the processing under the execution is changed to the character input/output processing by the application program from the character input/output processing by the preferential process.

FIGS. 6A–6E are diagrams indicating a display screen of the TTY terminal 23 in such a case that the preferential process 14 is started during character output to the TTY terminal 23 by the application program 14. It will be explained as an example that the character string, "1, 2, 3, . . . ,8, 9, 0" is outputted by the preferential process 14, while the character string, "a, b, c, ..., x, y, z" is being displayed for the TTY terminal 23 by the application program 11. By referring to FIGS. 6A–6E, the functions of address control register 18, DCW19 and DSW19' will be explained in summary.

Figure 6A:
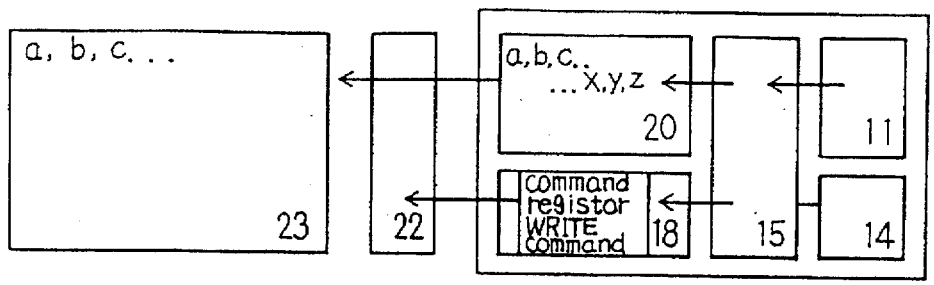
FIGS. 6A–6E are diagrams illustrating display screen of a terminal unit during the character input/output control in the present invention.

Since the request for the character string, "a, b, c ..., x, y, z" is requested from the application program 11 in FIG. 6A, the character data, "a, b, c, ..., x, y, z" is also stored in the communication buffer 20. Consequently, the write command is issued to the command register of the adapter control register 18. The adapter 22 sequentially reads the data stored in the communication buffer 20, depending on the instruction from the command register and then sequentially displays such data on the TTY terminal 23.

Figure 6B:
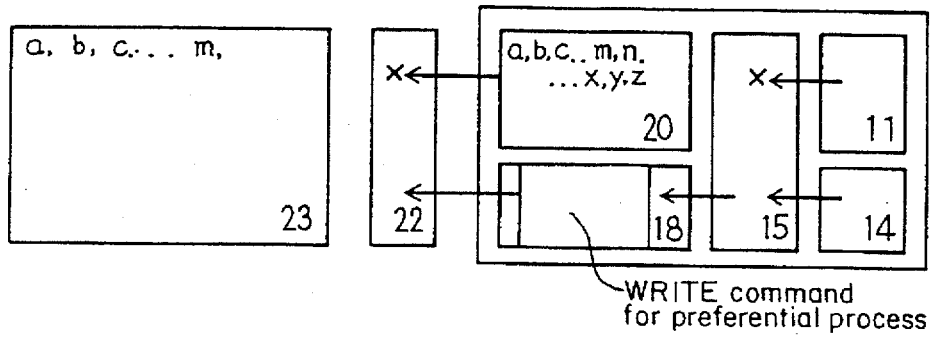

When the preferential process 14 is started when a character "m" is displayed in FIG. 6B, application of the TTY terminal 23 is informed to the TTY driver 15 from the preferential process 14, upon starting of the preferential process 14 as explained above and the TTY driver 15 transitions to the condition using the kernel debugger. With such transition, the WRITE command for preferential process 14 is issued to the adapter control register 18. The adapter 22 recognizes the issued WRITE command for preferential process, stops reading of output data from the communication buffer 20 and starts the character input and output processings by the preferential process.

Figure 6C:
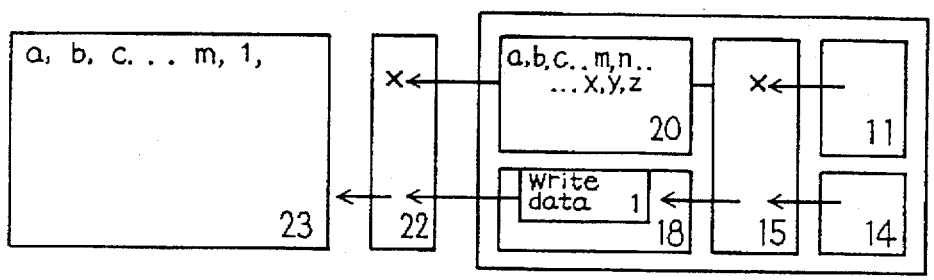

In succession, an output data "1" from the preferencial process 14 is written in the write data area 323 of the adapter control register 321 for one character input/output in FIG. 6C. The adapter 22 makes reference to the adapter control register 18 and displays the output data "1" written in the write data area 323 of the adapter control register 321 for one character input/output on the display screen of the TTY terminal 23, following the character "m" which is already displayed on the display screen. In the preferential process 11, the next output data "2" is written in the write data area 323 of the adapter control register 321 for one character input and ouput and displays it on the TTY terminal 23 as in the case of outputting the character "1" for sequential output of character to the preferential process 14.

Figure 6D:
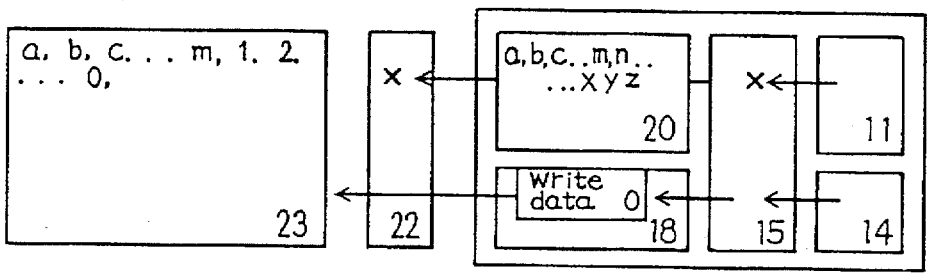
Figure 6E:
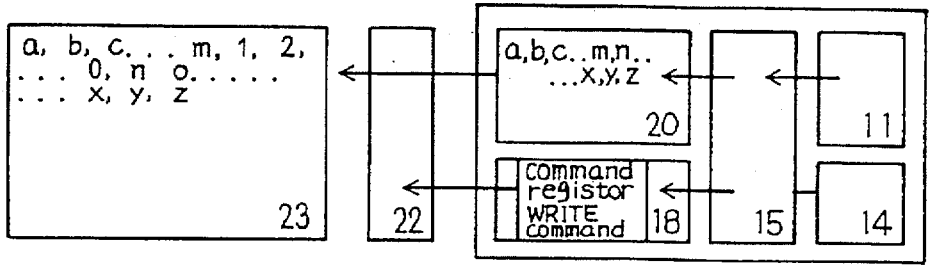

In FIG. 6D, when the final character "0" is outputted by the preferential process 14, the TTY driver 15 returns to the application process 11 and starts again the character input/output processings by the application program 11 which has been suspended temporarily. The adapter 22 sequentially outputs, when the operation by the application program 11 is started again, the character string "n, o, p, ..., x, y, z" stored in the communication buffer 20, following the character "0" in FIG. 6E.

In this embodiment, the adapter control register 18, DCW19/DSW19', communication buffer 20 and one character buffer 21 are all provided in the side of CPU 10. But, these are all or partly provided on the adapter 22, these elements operate in the same manner.

What is claimed is:

1. An input/output control system, comprising:

processor controlling operations of the input/output system;

a terminal inputting and outputting data for said processor;

first buffer storing first input/output data for a first program while the first program is executed;

second buffer, connected in parallel to the first buffer and storing second input/output data for a second program, which is operated in preference to the first program and which requires preferential input/output, the second input/output data being stored during execution of the second program, the preference of the second program over the first program being predetermined by the processor; and input/output adapter which is provided, independent of said processor, between said terminal and said processor for input/output processing between said processor and said terminal, wherein said input/output adapter stores data inputted from said terminal to said first buffer and said second buffer, outputs the output data stored in said first buffer to said terminal during execution of said first program and outputs the output data from said second buffer to said terminal during execution of said second program.

2. An input/output control system according to claim 1, further comprising an adapter control register including a command register for instructing operation to said input/output adapter from said processor and a status register for informing operating condition of said input/output adapter to said processor.

3. An input/output control system comprising:

processor controlling operations of the input/output system;

a terminal inputting and outputting data for said processor;

first buffer storing first input/output data for a first program while the first program is executed;

second buffer, connected in parallel to the first buffer and storing second input/output data for a second program, which is operated in preference to the first program and which requires preferential input/output, the second input/output data being stored during execution of the second program; and input/output adapter which is provided, independent of said processor, between said terminal and said processor for input/output processing between said processor and said terminal, wherein said input/output adapter stores data inputted from said terminal to said first buffer and said second buffer, outputs the output data stored in said first buffer to said terminal during execution of said first program and outputs the output data from said second buffer to said terminal during execution of said second program, and wherein said second buffer is a one character buffer in which data is stored in unit of a character.

4. An input/output control system according to claim 3, further comprising an adapter control register including a command register for instructing operation to said input/output adapter from said processor and a status register for informing operating condition of said input/output adapter to said processor.

5. An input/output system, comprising:

processor controlling operations of the input/output system;

a terminal inputting and outputting data for said processor;

first buffer storing first input/output data for a first program while the first program is executed;

second buffer, connected in parallel to the first buffer and storing second input/output data for a second program, which is operated in preference to the first program and which requires preferential input/output, the second input/output data being stored during execution of the second program;

input/output adapter which is provided, independent of said processor, between said terminal and said processor for input/output processing between said processor and said terminal, wherein said input/output adapter stores data inputted from said terminal to said first buffer and said second buffer, outputs the output data stored in said first buffer to said terminal during execution of said first program and outputs the output data from said second buffer to said terminal during execution of said second program; and an adapter control register including a command register for instructing operation to said input/output adapter from said processor and a status register for informing operating condition of said input/output adapter to said processor, wherein said adapter control register further comprises one character input/output register for instructing input/output operations between said processor and terminal by way of said input/output adapter during execution of said second program, wherein output data during execution of said second program is set character by character to said one character input/output register during character output to said terminal, and said input/output adapter outputs output data set in said one character input/output register to terminal.

* * * * *